United States Patent [19]

Toups

[11] 3,755,277
[45] Aug. 28, 1973

[54] ORIENTED HOLLOW ARTICLES FROM STYRENE-ACRYLONITRILE POLYMER

[75] Inventor: Edward C. Toups, Bartlesville, Okla.

[73] Assignee: Phillips Petroleum Company, Bartlesville, Okla.

[22] Filed: Jan. 14, 1971

[21] Appl. No.: 106,588

[52] U.S. Cl.......... 260/85.5 R, 260/93.5 A, 264/98
[51] Int. Cl........................ C08f 15/04, C08f 15/22
[58] Field of Search ............... 260/85.5 R, 85.5 HC, 260/85.5; 264/98

[56] References Cited
UNITED STATES PATENTS

| | | | |
|---|---|---|---|
| 3,082,482 | 3/1963 | Gaunt | 264/92 |
| 3,496,258 | 2/1970 | Wiley | 264/98 |
| 2,745,824 | 5/1956 | Melchore | 260/85.5 R |
| 2,739,142 | 3/1956 | Jones et al. | 260/85.5 HC |
| 2,921,932 | 1/1960 | Erbaugh et al. | 260/85.5 R |
| 3,198,775 | 8/1965 | Delacretaz et al. | 260/85.5 R |
| 3,505,249 | 4/1970 | Skochdopole et al. | 260/85.5 HC |
| 3,547,838 | 12/1970 | Moore et al. | 260/85.5 HC |

Primary Examiner—Harry Wong, Jr.
Attorney—Young & Quigg

[57] ABSTRACT

Hollow articles such as bottles are produced from styrene-acrylonitrile polymers under orientation conditions to give a high strength product.

8 Claims, No Drawings

ORIENTED HOLLOW ARTICLES FROM STYRENE-ACRYLONITRILE POLYMER

BACKGROUND OF THE INVENTION

This invention relates to high strength hollow articles made from styrene-acrylonitrile polymer.

Polystyrene has long been a commercially valuable plastic because of the relatively high tensile strength and exceptional clarity. However, the material is also known to the average customer by its tendency to crack or shatter on even light impact. Consequently, many impact grades of polystyrene have been produced and efforts have been directed toward incorporation of comonomers to achieve a better balance of properties. Generally, the incorporation of a rubbery component to improve impact strength results in a serious deterioration of the excellent optical properties of polystyrene. Copolymers of styrene and a small amount of acrylonitrile have achieved substantial commercial success because of the fact that such polymers exhibit considerable improvement in impact strength relative to polystyrene with only a modest deterioration in optical properties. In addition, styrene-acrylonitrile polymers have relatively good solvent resistance. However, in applications such as bottles and other hollow articles, properties of styrene-acrylonitrile polymers are sometimes only marginally acceptable.

Thus, it would be desirable to have hollow articles of styrene-acrylonitrile polymer which exhibit further improvement in impact strength and in some instances optical properties more nearly like unmodified polystyrene.

SUMMARY OF THE INVENTION

It is an object of this invention to provide high strength hollow articles of styrene-acrylonitrile polymers; it is a further object of this invention to provide high strength bottles of styrene-acrylonitrile polymers; it is yet a further object of this invention to provide hollow articles of styrene-acrylonitrile polymers having improved clarity; and it is still yet a further object of this invention to provide high strength hollow articles of styrene-acrylonitrile polymers having improved clarity.

In accordance with this invention, a hollow article is provided comprising a styrene-acrylonitrile polymer, said article having a tensile impact strength of greater than 25 ft-lbs per square inch as measured by ASTM D 1822-68, Type S Speciman.

DESCRIPTION OF THE PREFERRED EMBODIMENTS

The hollow articles of the instant invention can be made from any styrene-acrylonitrile copolymer. Such polymers are well known in the art and are generally designated as SAN resins. Generally, these resins will have from 10 to 40 weight percent polymerized acrylonitrile based on the total weight of polymerized styrene and polymerized acrylonitrile, preferred polymers having approximately 20–35 weight percent acryonitrile.

The polymers can contain conventional additives such as fillers, pigments, antioxidants, and the like, and it is also within the scope of the invention to utilize a blend of two or more of the above-identified polymers.

The above-identified polymers can be fabricated into the high strength articles of the invention by stretching at orientation temperature. This can be done for instance by extruding the polymer into a continuous length of tubing which is thereafter severed into individual open end parisons and heated, for instance, in an air oven to a temperature within the range of 175–350, preferably 230°–320° F. Generally, a temperature of 40–200, preferably 75°–150° F, below the homogeneous melt temperature of the polymer is satisfactory. Thereafter the heated parison is grasped at each end and stretched longitudinally, pinched shut at one end, and expanded by means of differential fluid pressure into conformity with the mold wall to achieve biaxial strengthening orientation. Apparatus suitable for this fabrication is disclosed in Wiley, U.S. Pat. No. 3,288,317, and Turner et al., U.S. Pat. No. 3,390,426, the disclosures of which are hereby incorporated by reference. Alternatively a closed end parison can be used which does not have to be pinched shut.

The high strength hollow articles of the instant invention are of primary utility as containers such as bottles although they can constitute any hollow article requiring high strength and/or high clarity. Resulting articles will have physical properties in typical wall sections thereof as follows: tensile impact strength in ft-lbs per square inch as measured by ASTM D 1822-68, Type S Speciman of greater than 25, generally about 39.2 or greater in the longitudinal direction and a tensile impact in ft-lbs per square inch as measured by ASTM D 1288-68, Type S Speciman in the circumferential direction of greater than 30, preferably about 47.2 or greater. The upper limit on the impact strength can vary greatly depending primarily on the amount of stretching achieved at orientation temperature. As a general rule, however, the tensile impact in the longitudinal direction will be within the range of 25–150 ft-lbs. Generally the tensile impact strength will be at least about two times the tensile impact strength of a similar wall section of an identical bottle made in accordance with conventional techniques utilizing a molten parison. The haze will generally be less than 4 percent, preferably about 2.2 or less. Generally the haze will be less than about one-half the haze of the wall section of an identical bottle made of identical polymer except fabricated in a conventional technique utilizing a molten parison. Of course, samples containing pigments and certain other additives will not exhibit low haze values.

The wall thickness in these typical sections (that is excluding corners, any seal area in the bottom, the thread and neck area, and the like) can vary greatly depending on the application intended for the product, but generally will be in the range of 10–50, preferably 15–40, mils.

The longitudinal stretch should be in the range of 40–200, preferably 50–150, percent. An increase in the length of the stretched portion of the parison from 5 inches to 10 inches, for instance, would be a 100 percent stretch.

EXAMPLE

A styrene-acrylonitrile polymer sold under the trade name Tyril 867 by Dow Corporaton was extruded into tubing having an outside diameter of 0.856-inch and a wall thickness of 130 mils. The resulting tubing was passed through a cooling zone utilizing 78°–85° F cooling water and cooled to room temperature. It was thereafter cut into 5.25-inch lengths and heated to 259° F over a period of 10 minutes in an air oven. It was then grasped at each end while at this temperature and stretched longitudinally 50 percent to give a longitudinal orientation and a polished 10 oz. Boston round mold closed threeabout having a leading edge at one end thereof which sealed the parison shut at this end. Air at a temperature of 80°-90° F and a pressure of 70 psia was introduced to expand the parison out into conformity with the walls of the molds to give circumferential orientation. The overall cycle time was 12 seconds and the bottle had a good appearance.

An identical resin was blown into bottles utilizing a conventional blow-molding technique wherein the melt temperature of the polymer was 400° F. Bottles were blown utilizing a polished 10 oz. Boston round mold in optimum conditions for conventional blow molding. Overall cycle time was 22 seconds and the bottle had a good appearance. Physical properties were determined on the bottles made in accordance with the invention and the bottles in the conventional blow molding operation using specimens cut from the side walls of the bottles. The results were as follows:

TABLE I

| Properties | Invention | Conventional Bottle |
|---|---|---|
| Tensile Strength, psi (ASTM D 638-68) | 10,890 | 8,920 |
| Elongation, % (ASTM D 638-68) | 7 | 5 |
| Tensile Modulus, psi (ASTM D 638-68) | 249,000 | 199,000 |
| Tensile, Impact, ft-lbs/in | | |
| Longitudinal | 39.2 | 14.4 |
| Circumferential | 47.2 | 19.2 |
| (ASTM D 1822-68 Type S Speciman) | | |
| Haze, % | 2.2 | 6.7 |

As can be seen the biaxially oriented bottles in accordance with the invention possess even greater impact strength than those made in the conventional process and further exhibit exceptionally low haze, it being noted that the 6.7 percent value for the bottle made in conventional molding operation is within a range considered quite good for an impact grade of styrene-containing resin; however, the bottles of the invention have even greater impact strength and optical clarity reduced almost to the level of pure polystyrene.

While this invention has been described in detail for the purpose of illustration, it is not to be construed as limited thereby but is intended to cover all changes and modifications within the spirit and socpe thereof.

I claim:

1. A bottle made by extruding a polymer composition comprising as the sole polymeric ingredient a styrene-acrylonitrile copolymer having 10 to 40 weight percent polymerized acrylonitrile and 90 to 60 weight percent polymerized styrene into a continuous length of tubing; thereafter severing said tubing into an individual open end parison and heating same to an orientation temperature of 40°-200° F below the homogeneous melt temperature thereof; thereafter stretching said thus heated parison longitudinally an amount within the range of 40-200 percent; and expanding same out into conformity with a mold to give a bottle having typical wall sections with a tensile impact strength of greater than 25 ft-lbs. per square inch measured in a longitudinal direction.

2. A bottle according to claim 1 wherein said copolymer contains about 20-35 weight percent polymerized acrylonitrile.

3. A bottle according to claim 1 wherein said wall sections have a tensile strength in the circumferential direction of greater than 30 ft-lbs per square inch.

4. A bottle according to claim 1 wherein said impact strength in longitudinal direction is about 39.2 or greater.

5. A bottle according to claim 1 wherein said wall sections have a haze of less than 4 percent.

6. A bottle according to claim 1 wherein said wall sections have haze of about 2.2 or less.

7. A bottle according to claim 1 wherein said parison is heated to an orientation temperature of 230° to 320° F prior to stretching.

8. A bottle according to claim 1 wherein said wall sections have an impact strength within the range of 25 to 150 ft./lbs. in the longitudinal direction and a haze of less than 4 percent.

* * * * *